W. A. HALL, Sr.
POTATO PLANTER.
APPLICATION FILED MAR. 16, 1911.

1,016,265.

Patented Feb. 6, 1912.
2 SHEETS—SHEET 1.

Inventor
William A. Hall, Sr.

Witnesses

By

Attorney

W. A. HALL, Sr.
POTATO PLANTER.
APPLICATION FILED MAR. 16, 1911.

1,016,265.

Patented Feb. 6, 1912.

2 SHEETS—SHEET 2.

Inventor
William A. Hall, Sr.

Witnesses

By

Attorney

UNITED STATES PATENT OFFICE.

WILLIAM A. HALL, SR., OF PARDEEVILLE, WISCONSIN.

POTATO-PLANTER.

1,016,265.  Specification of Letters Patent. Patented Feb. 6, 1912.

Application filed March 16, 1911. Serial No. 614,882.

*To all whom it may concern:*

Be it known that I, WILLIAM A. HALL, Sr., a citizen of the United States, residing at Pardeeville, in the county of Columbia and State of Wisconsin, have invented certain new and useful Improvements in Potato-Planters, of which the following is a specification.

This invention relates to planters, and especially to potato planters, of that type having a rotary disk with a device thereon for picking up the seed from a trough and dropping the same into a chute for conducting the seed to the ground.

The object of the invention is to provide an improved automatic dropper which will be particularly efficient in planting potatoes or other irregular seeds.

The invention is illustrated in the accompanying drawings in which—

Figure 1:
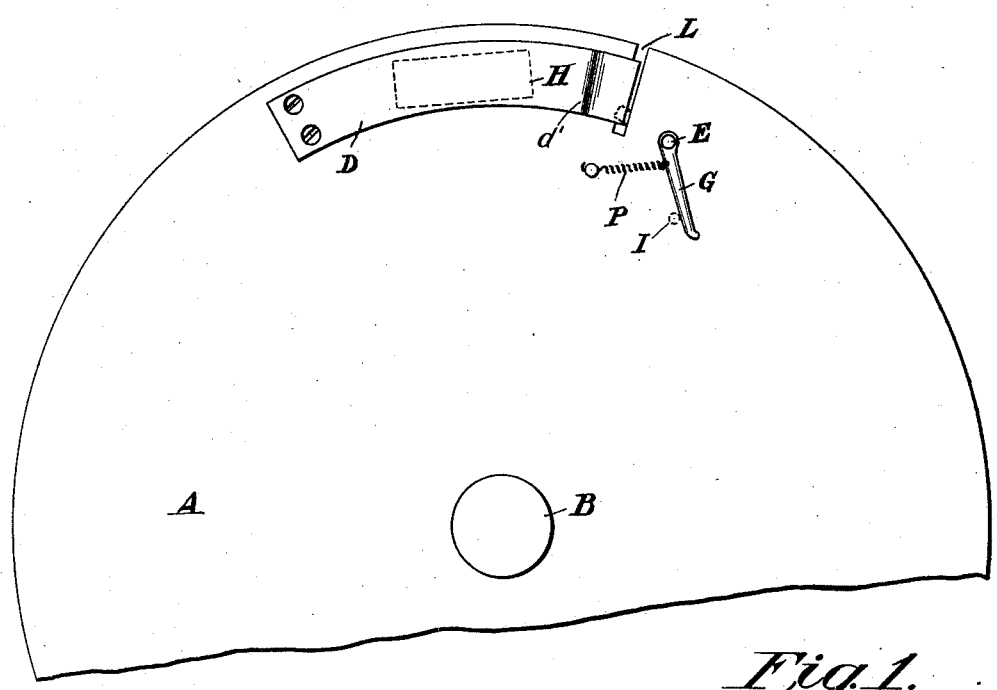
Figure 2:
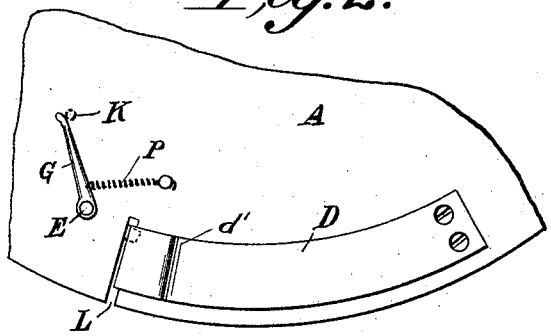
Figure 3:
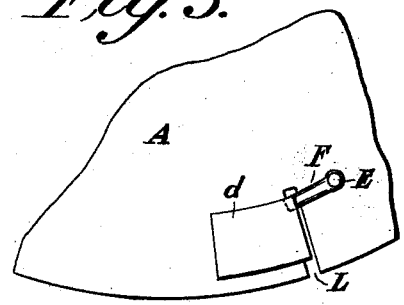
Figure 7:
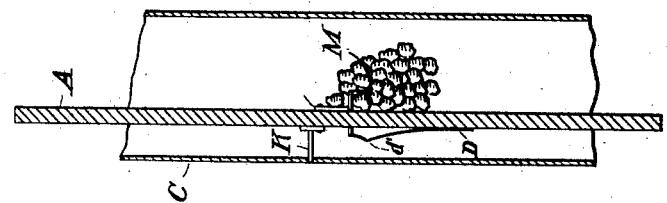
Figure 6:
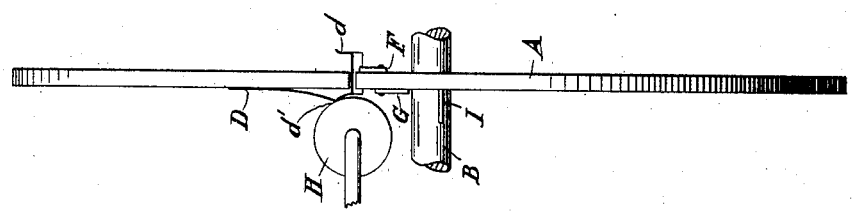
Figures 5, 8:
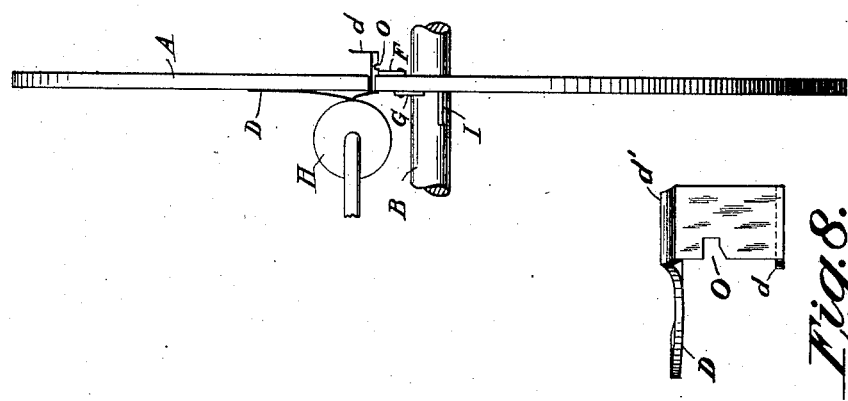
Figure 4:
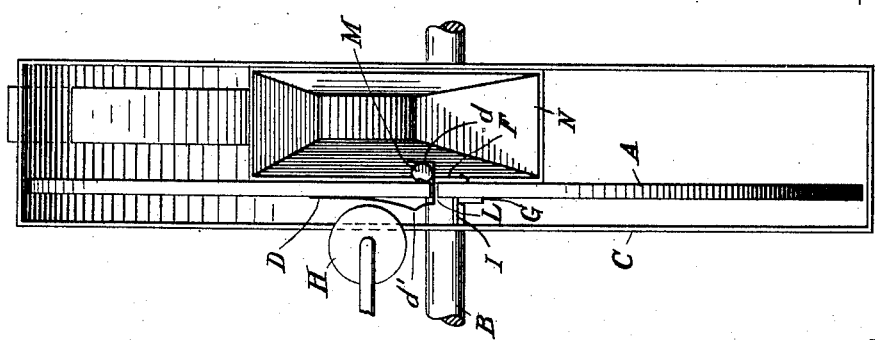

Figure 1 is a side elevation of the disk with one side of the trough removed, the picking devices being in upper position. Fig. 2 is a detail in side elevation, of a part of the disk, with said devices at the bottom of the trough. Fig. 3 is a view of the side of the disk opposite to that shown in Fig. 2. Fig. 4 is a top plan view of the disk and the trough in which it runs. Figs. 5, 6 and 7 are similar views with the dropping devices in different positions. Fig. 8 is a detail of the picker hook.

Referring specifically to the drawings A is a disk which turns on a shaft B in trough C. The shaft may be rotated by any suitable connection to a moving part of the machine. This disk carries, fastened to one side thereof near its edge, a flat spring or vibrating hook D the free end of which is bent to extend through a slot L in the periphery of the disk, the toe $d$ of the hook being on the side of the disk opposite to the body of the spring, in position to clamp the seed, M, against the side of the disk, as shown in Fig. 4, under tension of the spring, which tends to draw said toe toward the side of the disk. Located behind the hook (in the direction of travel) is a small rock shaft E, extending through a hole in the disk and provided at one end with a lever G and at the other end with a lever F. A spring P is connected to the lever G, and tends to rock the shaft to engage the lever F in a notch O in the inner edge of the hook D, as shown in Figs. 3 and 6. The lever F thus forms a catch to hold the hook partly open and also to prevent it being wedged open too far, as hereinafter explained.

H is a stationary roller fastened to a suitable support or frame, in position to pass over and depress the spring hook D as the disk revolves and when the hook reaches its upper position as indicated in Figs. 1, 4, 5 and 6.

I is a pin projecting inwardly from the side of the trough C, near the top of the disk, and K is another pin projecting inwardly near the bottom of the trough, and these pins are arranged to strike the lever G to rock the shaft E at the top and bottom positions respectively.

One side of the notch O, that is the side farthest from the toe of the hook, is square or straight, and the other side is beveled part way in.

N is a chute for the potato to drop in when released at the top.

The spring D has near its end a slight outwardly extending bend or corrugation $d'$ which, when the roller H passes thereover, causes the spring to be pressed in to the limit, as shown in Fig. 5, and after the roller passes this rib the spring will lift the hook out slightly, to allow the lever F to engage in the notch O, as shown in Fig. 6.

The bottom of the trough is shaped as usual to throw the potatoes, or seed, in toward the disk, in the line of travel of the hook. Just after the hook has passed the lowest point of its travel and started upward the lever G strikes pin K as indicated in Fig. 2, and the shaft E is rocked and lifts the lever F from the bottom of the notch O, to its beveled portion, permitting the spring to fly outward and gripping any potato that may be inside of the toe $d$ or between said toe and the side of the disk, in which position it is carried to the top, and when the spring runs over the roller H it is depressed thereby opening the hook and releasing the potato which drops into the chute N and is carried downward to be planted. The lever G strikes the pin I and releases the lever F from the notch O at this time. When the spring leaves the roller H in the continued revolution of the disk the lever G passes the pin I and the spring P causes the lever F to again engage in the slot O as shown in Fig. 6, and holds the spring so that it cannot draw farther in or be pushed farther out. Ordinarily the seed potato is cut smaller than the space thus maintained between the toe of the hook and the side of the disk, and in such case the spring D draws outwardly to pick up the potato after the lever G strikes the pin K at the bottom, as above described, when the lever F is lifted out of the slot O. But if the seed or piece of potato which is engaged by the hook at the bottom of the trough is larger than the space inside the toe of the hook it may get wedged in in such a way that the spring D cannot recede or fly out when the lever F is lifted out of the notch O by the action of the pin K. In that case the straight side of the notch engages the lever F and thus prevents the spring D from being crowded inwardly by the pressure of the potato. In other words, the large piece of potato will be wedged in between the disk and the toe of the hook in consequence of the pressure incident to the rotation of the disk and the hook will be prevented from opening by contact of the straight side of the notch with the lever F.

It should be explained that the pin K is so located that it will not lift the lever F completely out of the notch O, but only up to the beveled part thereof, so that when the wedging action as described occurs the lever F will still remain engaged in the notch O against the straight side thereof. The potato, then, being so wedged within the toe of the hook will be carried up to the top and when the lever G strikes the pin I the lever F will be swung entirely out of the notch O, the pin I being so located as to produce this action. That is, the pin I turns the lever somewhat farther than the pin K. After the lever F is lifted out of the notch O by the pin I the roller H runs over the spring and depresses the same to the limit, as shown in Fig. 5, thereby releasing the wedged potato and permitting it to drop into the chute. After the roller H passes the rib d' the spring recedes a short distance, allowing the lever F to be again pulled into the notch O, as shown in Fig. 6, for the next operation. The picking device will thus operate on pieces of different sizes, without the possibility of an unusually large piece becoming wedged in the hook in such position that it cannot be released, under which condition the operation of the planter would be stopped.

Having thus described my invention, what I claim as new and desire to secure by Letters Patent is—

1. In a seed planter, the combination of a revoluble carrier, a spring clamping hook carried thereby, and adapted to clamp a seed against the carrier, a catch carried by the carrier and engaging the hook to hold the same in open position, means to disengage the catch, and means to release the hook from the seed.

2. In a seed planter, the combination of a revoluble carrier, a spring hook carried thereby, and adapted to clamp a seed against the carrier, a catch carried by the carrier and engaging the hook to hold the same in partly open position, means to disengage the catch, and means to press the hook to full open position, to release the seed.

3. In a seed planter, the combination of a revoluble carrier, a spring hook carried thereby and adapted to clamp a seed against the carrier, said hook having a notch, a spring catch mounted on the carrier and engaging in the notch to hold the hook in partly open position, means to release the catch from the notch, and means to fully open the hook to release the seed therefrom.

4. In a seed planter, the combination of a trough, a disk revoluble therein, a spring clamping member carried by the disk and adapted to clamp a seed, a catch carried by the disk and engaging said member to hold the same in partly open position, means in the trough engageable with the catch to release the same from the clamping member at a point during the lower part of its revolution, to pick up the seed, and means to open the clamping member at a point in the upper part of its revolution, to drop the seed.

5. In a seed planter, the combination of a trough, a disk revoluble therein, upper and lower projections in the trough, a spring hook carried by the disk and adapted to clamp a seed against the side thereof, said hook having a notch, and a spring catch carried by the disk and normally engaging in said notch and holding the hook in partly open position, the projections being located to strike the catch and release the same from the notch, and means to fully open the hook at a certain point in the revolution of the disk.

6. In a seed planter, the combination of a trough, a revoluble disk therein, a spring hook carried by the disk and adapted to clamp a seed against the side of the disk, said hook having a notch which is square on one side and partly beveled on the other, a lever pivoted on the disk and provided with a spring causing it to normally engage in the notch in the hook, to hold the hook partly open, a pin projecting in the lower part of the trough and arranged to strike the lever and lift the same to the beveled part of the notch, to allow the hook to close on a seed, another pin projecting in the upper part of the trough and arranged to strike the lever and lift the same completely from the notch, and means at the upper part of the trough to fully open the hook when the lever is so lifted from the notch, to drop the seed.

7. In a seed planter the combination of a trough, a revoluble slotted disk therein, a spring hook fastened to one side of the disk and projecting through the slot, with its toe arranged to clamp a seed against the opposite side of the disk, said hook having a notch therein, a spring actuated lever normally engaging in said notch to hold the hook in partly open position, a device in the lower part of the trough engageable with said lever to release the same from the notch, and a device in the upper part of the trough engageable with the spring and adapted to open the hook to release the seed.

8. In a seed planter the combination of a trough, a revoluble disk therein, a spring hook working through the disk and adapted to clamp a seed against the side of the disk, said hook having a notch one edge of which is inclined at the outer end, a spring catch carried by the disk and engaging in said notch to hold the hook in partly open position, a projection in the lower part of the trough arranged to strike the catch and lift the same to the inclined part of the edge of the notch, to allow the hook to close on a seed, a projection in the upper part of the trough arranged to strike the catch, and lift the same completely out of the notch, and means in the upper part of the trough to open the hook to full extent, when the catch is so released, to allow the seed to drop.

In testimony whereof, I affix my signature in presence of two witnesses.

WILLIAM A. HALL, Sr.

Witnesses:
R. E. Garner,
S. H. Dooley.

---

Copies of this patent may be obtained for five cents each, by addressing the "Commissioner of Patents, Washington, D. C."